United States Patent [19]

Murakami et al.

[11] Patent Number: 4,842,387

[45] Date of Patent: Jun. 27, 1989

[54] AUTOMATIC FOCUSING APPARATUS FOR USE IN VIDEO CAMERA AND THE LIKE

[75] Inventors: Toshio Murakami; Takashi Azumi, both of Yokohama; Hiroshi Sakurai, Kamakura; Takesuke Maruyama; Yoshihiro Todaka, both of Yokohama, all of Japan

[73] Assignees: Hitachi, Ltd.; Hitachi Video Engineering Incorp., both of Japan

[21] Appl. No.: 151,963

[22] Filed: Feb. 3, 1988

[30] Foreign Application Priority Data

Feb. 6, 1987 [JP] Japan .................................. 62-24586
Dec. 23, 1987 [JP] Japan ................................ 62-323945

[51] Int. Cl.$^4$ ............................................. G02B 7/04
[52] U.S. Cl. .................................... 350/429; 354/404; 358/227
[58] Field of Search ................ 350/429, 430; 354/403, 354/404; 250/201; 358/209, 225, 227

[56] References Cited

U.S. PATENT DOCUMENTS

| | | | |
|---|---|---|---|
| 3,950,764 | 4/1976 | Hosoe et al. | 354/404 |
| 3,953,729 | 4/1976 | Hosoe et al. | 354/404 |
| 3,961,178 | 6/1976 | Hosoe et al. | 354/404 |
| 4,161,756 | 7/1979 | Thomas | 350/429 |
| 4,611,244 | 9/1986 | Hanma et al. | |

FOREIGN PATENT DOCUMENTS 55-76309 6/1980 Japan .
58-40982 3/1983 Japan .
60-42723 3/1985 Japan .

OTHER PUBLICATIONS

National Technical Report vol. 31, No. 6, Dec. 1985, pp. 65–67.

*Primary Examiner*—Bruce Y. Arnold
*Assistant Examiner*—Loha Ben
*Attorney, Agent, or Firm*—Antonelli, Terry & Wands

[57] ABSTRACT

An automatic focusing apparatus for use in a video camera and the like wherein one optical element other than a focusing lens means of an optical system is moved for focusing in the in-focus direction while being vibrated slightly by means of a motor capable of being driven by pulses.

11 Claims, 5 Drawing Sheets

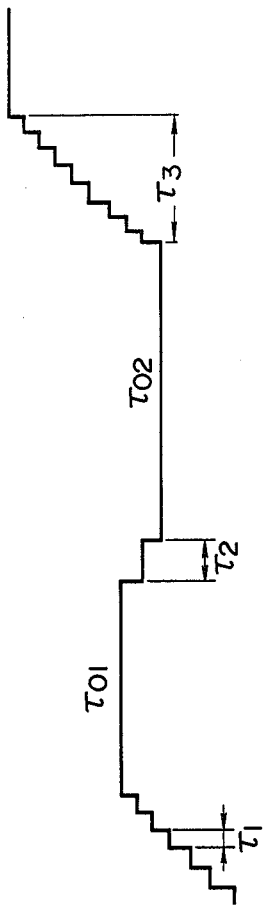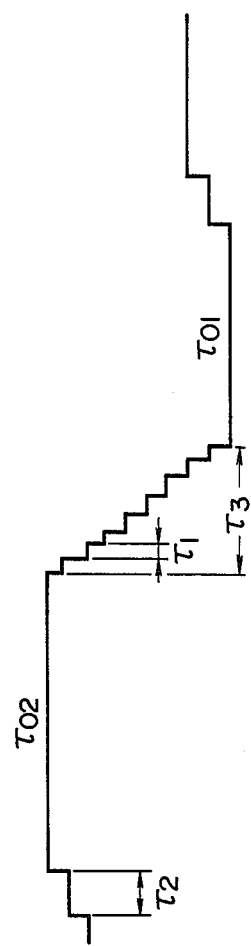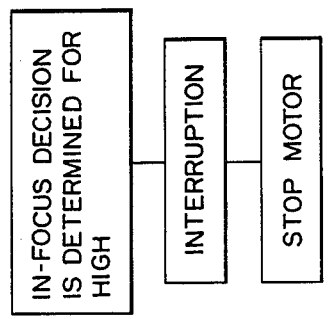
F I G. 6A
F I G. 6B
F I G. 7B

AUTOMATIC FOCUSING APPARATUS FOR USE IN VIDEO CAMERA AND THE LIKE

BACKGROUND OF THE INVENTION

This invention relates to an automatic focusing apparatus for use in a video camera, electronic still camera and so on, and more particularly to an automatic focusing apparatus suitable for use in a TTL (Through The Lens) imaging system in which a high frequency band component (focal voltage) is derived from an image signal and the lens position is controlled such that the maximum of the focal voltage can be obtained.

As disclosed in, for example, JP-A-60-42723 or National Technical Report, Vol 31, No. 6, Dec., 1985, pp 65-67, a TTL imaging type automatic focusing apparatus has been proposed which has a feedback circuit wherein a high frequency band component signal is extracted from an image signal produced from an image sensing device while the optical path length between an object to be imaged and the light receiving surface of the image sensing device is being varied slightly by using a signal of a predetermined reference frequency, a frequency component signal representative of a slight variation is derived from the high frequency band component signal, the frequency component signal is compared with the reference frequency signal for slight variation of the optical path length, an in-focus direction is determined on the basis of a signal obtained from the comparison, and a focusing lens is moved in the in-focus direction to obtain the maximum value of the high frequency band component signal. According to the aforementioned JP-A-60-42723, the optical path length can be varied to a small extent in a way in which a vibratory prism disposed in front of the image sensing device and mounted with a piezoelectric element is vibrated under the application of an electric signal of a predetermined reference frequency to the piezoelectric element to slightly change the optical path length in the optical axis direction of the lens system or in another way in which a lens other than a focusing lens is vibrated by means of a piezoelectric element to slightly change the optical path length. An example specifically practiced in the latter way is described in the literature.

In general, a zoom lens system 1 in a video camera and the like basically comprises, as shown in FIG. 3, a focusing lens (front or objective lens) means 2, a variator lens means 3, a compensator lens means 4, an aperture unit 5 and an image forming lens (master lens) means 6. As well known in the art, of the basic construction, the focusing lens means 2 has the function of focusing a desired object which lies at an arbitrary distance, the variator lens means 3 has the function of changing magnification for zooming, the compensator lens means 4 is movable for zooming and has the function of correcting an error in focusing the desired object during zooming, and the image forming lens group 6 has the function of forming an optical image on an image sensing device 7.

Thus, according to the example in the aforementioned literature, either the prism provided separately from the lens system 1 of the above basic construction and disposed in front of the image sensing device 7 or the image forming lens 6 is vibrated by means of the piezoelectric element to slightly vary the optical path length.

As is clear from the above, the prior art employs a lens focus matching unit inserted in the feedback loop and therefore an automatic focusing apparatus of excellent in-focus accuracy can advantageously be realized with the lens focus matching unit even when the lens focus matching unit is assembled with less accuracy and is of rough mechanical accuracy. However, the prior art particularly requires the piezoelectric element for a mechanism adapted to slightly vibrate the optical path length, raising a problem that the mechanism must be contrived structurally in point of, for example, mounting and supporting in order to obtain long-term stability. Further, a drive voltage of several of tens of volts or more is required for driving the piezo-electric element, raising another problem that an instrument such as a video camera designed to operate at a low voltage of battery must include an additional means for generating such a relatively high voltage.

JP-A-55-76309 discloses another automatic focusing apparatus which can dispense with the piezoelectric element having the above disadvantages to move a focusing or objective lens in the in-focus direction while keeping the focusing or objective lens vibrated slightly.

In particular, according to this prior art, a focusing or objective lens means is moved by means of a motor while being vibrated slightly and the separate provision of the mechanism for slight vibration of the optical path length as described previously is unneeded, leading to presumed simplification of construction. However, a DC motor is generally used for focus driving and it is very difficult for this type of motor to slightly vibrate the relatively weighty focusing or objective lens means to a visually undetected degree under the influence of large inertia of the focusing or objective lens means and in addition, it is also very difficult from the standpoint of motor life to practically cause the motor to unceasingly vibrate or rotate alternately clockwise and counterclockwise.

SUMMARY OF THE INVENTION

An object of this invention is to provide an automatic focusing apparatus for use in a video camera and the like in which the same optical element is used in common as an element which is slightly vibrated to vibrate the optical path length to a small extent and also as an optical element which is moved in the infocus direction.

Another object of this invention is to provide an automatic focusing apparatus for use in a video camera and the like in which at least one optical element except a focusing or objective lens means having a large mass in the optical system is moved in the in-focus direction while being vibrated slightly and controlled to be in position.

Still another object of the invention is to provide an automatic focusing apparatus for use in a video camera and the like in which at least one optical element in the optical system is moved in the in-focus direction while being vibrated slightly by means of a motor capable of being driven by a pulse signal.

According to one aspect of the invention, since the relatively light weight optical element except the focusing or objective lens means having a large mass is moved in the in-focus direction while being vibrated slightly, a motor capable of being driven by a low voltage and a low torque, especially, a motor capable of being driven by a pulse signal can be used.

According to another aspect of the invention, since a motor capable of being driven by a pulse signal is used to move an optical element of the optical system in the in-focus direction while causing the optical element to be vibrated slightly, the optical element can be positioned at the in-focus point with very high accuracy to thereby improve quality of sensed image.

BRIEF DESCRIPTION OF THE DRAWINGS

FIGS. 6A and 6B are diagrams corresponding to the FIG. 5A diagram and useful to explain examples of slight vibration directed to improvements of detection sensitivity in accordance with the invention.

FIGS 7A and 7B are examples of flow charts by which the examples of FIGS. 6A and 6B can be implemented.

DESCRIPTION OF THE PREFERRED EMBODIMENTS

Firstly, an optical system to which the present invention is applied will be described.

Figure 3:
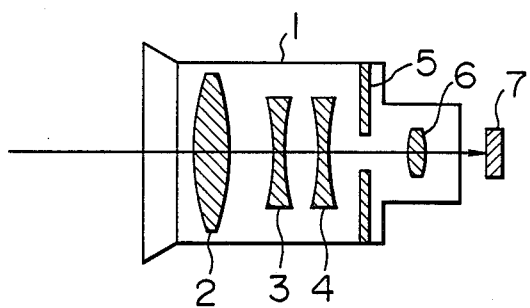
FIG. 3 schematically illustrates an example of a zoom lens generally used in a video camera and to which the present invention is applied.

In the general zoom lens system 1 as shown in FIG. 3, it is possible in principle to effect focusing adjustment for a desired object which ranges from a near distance to an infinitely far distance by moving the entirety or part of the master lens means 6 or alternatively the image sensing device 7 with the focusing or objective lens means 2 fixed. In this case, the variator lens means 3 and the ensuing lens means must have the function of focusing. Therefore, when the zooming position is changed during zooming with the result that an object at a distance becomes out of focus during zooming, the optimum position of the master lens group or the optimum position of the image sensing device changes as the zooming proceeds. However, the automatic focusing apparatus constructed as above has the feedback circuit which can obtain the maximum value of the high frequency band component of an image signal, in other words, can detect a blur of a sensed image and minimize the blur, and hence the apparatus can perform the automatic focusing operation even during the zooming operation to constantly provide proper sensed images.

As regards the image sensing device, a compact and light weight solid-state image sensing device has recently played the part of an image pickup tube and has been practiced and used principally as an image sensing device. Such a solid-state image sensing device has a weight of 2 to 4 grams and is compact and light weight as compared to the focusing lens means 2 shown in FIG. 3 and having a weight of several of tens of grams. On the other hand, the master lens means 6 is also sufficiently lighter than the focusing or objective lens means 2. Especially, part of the master lens means 6 can be moved for focusing adjustment and it is sufficient that for example, one to two lenses, having a weight of about 1 to 2 grams, of the lens means 6 be moved. Thus, the master lens means or the image sensing device has small inertia and can be moved for focusing by means of a motor while being vibrated to a desired small extent. A compact, low torque motor may be used purposely for driving such a light weight focusing mechanism. Accordingly, a brushless, pulse driven motor such as a pulse motor and an ultrasonic motor can be employed and because of small inertia of the motor per se, the motor can easily be controlled for achieving displacement of a predetermined amount and highly accurate slight vibration of a desired proper amount. Life of the motor can also be prolonged considerably.

By using the master lens or the image sensing device as the focusing mechanism and by moving the focusing mechanism while keeping the focusing mechanism slightly vibrated at a predetermined period, the image signal produced from the image sensing device can be of the same quality as that of the image signal obtained with the prior art. Thanks to the elimination of the special mechanism for slight vibration of the optical path length and the fixed focusing or objective (front) lens, a simplified and inexpensive automatic focusing apparatus can be realized.

Figure 1:
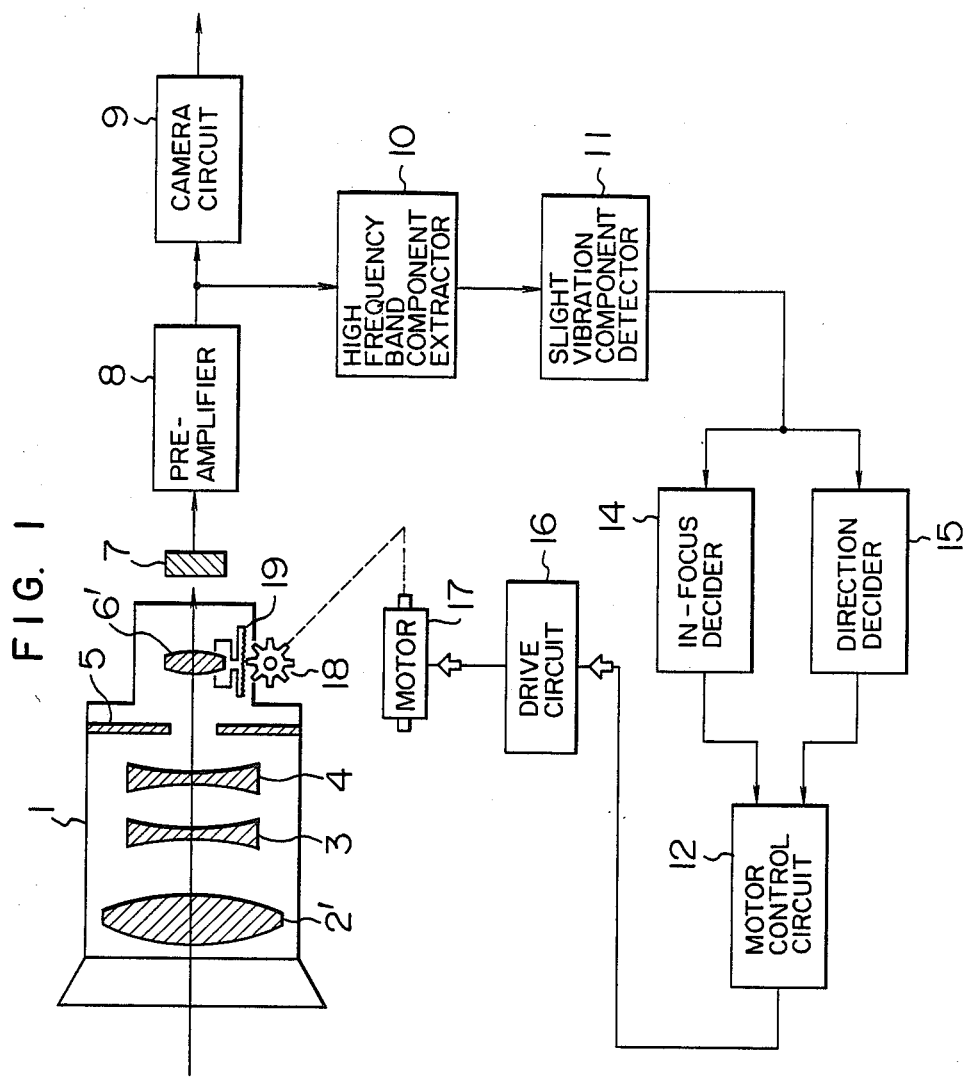
FIG. 1 is a schematic block diagram showing the overall construction of an automatic focusing apparatus according to a first embodiment of the invention.

Referring now to FIG. 1, an automatic focusing apparatus according to a first embodiment of the invention will be described. As shown, an imaging lens system 1 has a fixed front or objective lens means 2', immovable in contrast to the front or objective lens means of the prior art, a variator lens means 3, a compensator lens means 4, an aperture unit 5 and a master lens means 6'. Associated with the lens system 1 is an image sensing device 7. The master lens means 6' is movably supported by a moving means generally designated by reference numeral 19.

In an illustration of FIG. 1, the entirety of the master lens means 6' is movably supported ut part of the master lens means 6' may be constructed so. A gear 18 meshes with a rack of the moving means 19 and is driven by a motor 17 to move the master lens means 6' in the optical axis direction while causing the master lens means 6' to be slightly vibrated at a predetermined period in the optical axis direction.

A drive circuit 16 is responsive to a signal from a motor control circuit 12 to drive the motor 17. The motor control circuit 12 applies to the drive circuit 16 a control signal necessary for position controlling and focusing the master lens 6' in such a manner that the master lens 6' is moved to an in-focus point while being vibrated reciprocatively to a small extent at a predetermined reference frequency (for example, ½, ⅔ or ¼—of the vertical synchronizing frequency fv), in other words, being slightly vibrated for focusing to a visually undetected degree.

In response to slight vibration of the master lens 6', the output voltage of the image sensing device 7, especially its high frequency band component, changes. The output signal produced from the image sensing device 7 is amplified at a pre-amplifier 8 and a camera circuit 9 generates a camera signal. A high frequency band component extractor 10 extracts from an image signal a high frequency band component which covers a frequency band of, for example, from 500 KHz to 3 MHz. Because of slight vibration of the focusing mechanism, the output signal from the high frequency band component extractor 10 contains a frequency component indicative of a slight vibration of the focusing mechanism. A slight vibration component detector 11 detects the vibration frequency component to produce a detection signal which is applied to an in-focus decider 14 and a direction decider 15. The direction decider 15 decides the polarity of the detection signal and supplies to the motor control circuit 12 an information signal which determines the direction of rotation of the motor, so that the motor 17 is driven to provide the maximum amplitude of the high frequency band component extracted from the image signal delivered out of the image sensing device 7, that is, to complete focusing adjustment. The in-focus decider 14 is adapted to perform in-focus decision on the basis of an amplitude level of the detection signal from the detector 11. For example, when the detection signal is below a predetermined level, the in-focus decider 14 makes in-focus decision and supplies in-focus information to the motor control circuit 12 so as to stop the motor 17.

Figure 4:
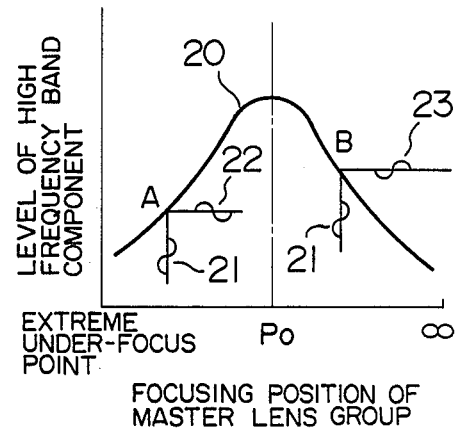
FIG. 4 is a graph illustrating a level characteristic, plotted with respect to the focusing position, of a high frequency band component produced from the image sensing device.

The motor is controlled in accordance with the output voltage of high frequency band component from the image sensing device 7 as will be described with reference to FIG. 4. When the in-focus matching unit of the lens system 1, i.e., the master lens group 6' moves from an extreme under-focus point to an infinite over-focus point and the object to be imaged is assumed to be focused at a position Po, the amplitude of the high frequency band component is plotted to exhibit a convex curve having the maximum value or peak at position Po as graphically shown in FIG. 4. The master lens group is slightly vibrated as indicated at 21 in FIG. 4, and a signal of one polarity indicated at 22 is detected from the detector 11 when the master lens means is too near, with respect to the object, to focus the object and a signal of the other polarity indicated at 23 is detected from the detector 11 when the master lens means is too far to focus the object. The direction decider 15 performs synchronous detection of the polarity signal 22 or 23. The direction decider 15 generates a low level signal for driving the motor 17 to move the master lens means in the departing direction when synchronously detecting the polarity signal 22 and generates a high level signal for driving the motor 17 to move the master lens means in the approaching direction when synchronously detecting the polarity signal 23, thereby causing the motor control circuit 12 to perform operations by which the master lens means can be moved to the position Po at which the maximum or peak of the convexly plotted amplitude of the high frequency band component takes place as shown in FIG. 4. When the position of the master lens means coincides with the position Po, the in-focus decider 14 determines that the signal from the detector 11 is below the predetermined level and produces a high level signal. Responsive to the high level signal from the in-focus decider 14, the motor control circuit 12 operates to stop the motor. When responding to a low level signal from the in-focus decider 14, the motor control circuit 12 follows the high or low level signal of the direction decider 15 to drive the motor 17 in one direction.

As described above, according to the first embodiment of the invention, the entirety or part of the master lens means 6' is moved for focusing adjustment while being vibrated slightly by means of the motor and because of small inertia of the master lens means, the slight vibration can be done properly to a visually undetected extent.

Figure 2:
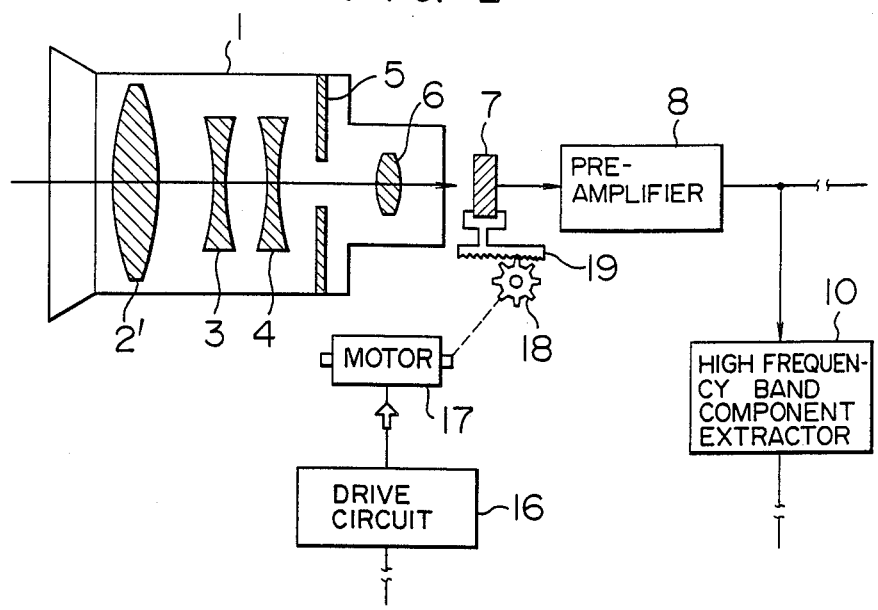
FIG. 2 is a schematic block diagram showing a partial construction of an automatic focusing apparatus according to a second embodiment of the invention.

A second embodiment of the automatic focusing apparatus of the invention will now be described with reference to FIG. 2 in which components like those of the FIG. 1 embodiment are designated by like reference numerals. Being different from the FIG. 1 embodiment wherein the master lens means 6' has the function of focusing, the embodiment of FIG. 2 provides an image sensing device 7 with the function of focusing. Thus, a motor 17 is driven to move the image sensing device 7 for focusing while keeping the image sensing device 7 vibrated slightly, and a master lens means 6 is fixed.

The FIG. 2 embodiment has a feedback circuit system including the image sensing device 7, a preamplifier 8, a high frequency band component extractor 10, a detector 11 for detecting a reference frequency component of slight vibration, a motor control circuit 12, a motor drive circuit 16, a motor 17, a gear 18 and an image sensing device moving means 19. It will therefore be understood that the feedback circuit system is separated from a lens system 1 and the lens system has only one moving part standing for a zooming mechanism. This means that design of lens is less affected by the moving part and a further simplified automatic focusing apparatus can be realized.

Since the master lens means or the image sensing device to be moved by means of the motor in the embodiment of FIG. 1 or FIG. 2 is compact and light weight, the type of the motor 17 is not particularly limited but a pulse driven motor such as a stepping motor or an ultrasonic motor having a rotor of small inertia and capable of properly controlling the amount of slight vibration may be used preferably. This type of motor is a contactless one and it has a long life and is easy to control in speed, aiding in further improving the automatic focusing apparatus.

Figures 5A, 5B, 5C:
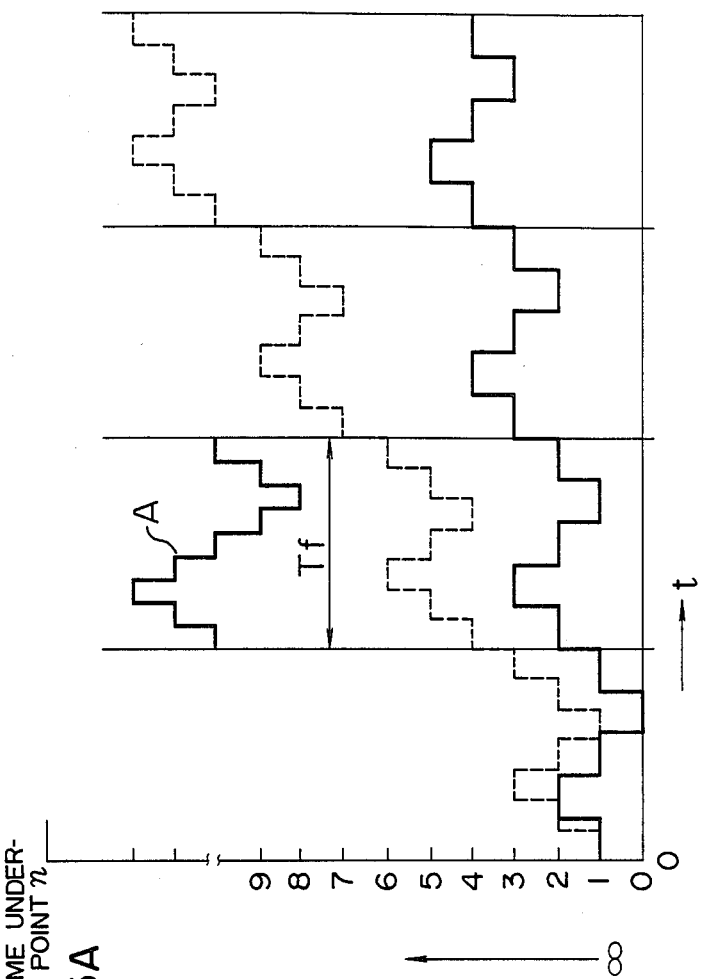
FIGS. 5A to 5C are diagrams useful in explaining the operation of the embodiments.

The master lens means 6 or image sensing device 7 can be moved while being vibrated slightly by means of the pulse driven motor such as a stepping motor in a manner as illustrated in FIGS. 5A to 5C. Exemplarily, the amount of movement between the infinite over-focus point and the extreme under-focus point is divided by n steps so that the master lens means or image sensing device may be 1/n moved by one pulse. In one mode as indicated by solid-line construction in FIG. 5A, the movement proceeds as time t elapses in such a way that one-step slight vibration and subsequent one-step transition during one cycle $T_f$ are repeated. In another mode as indicated by broken-line construction in FIG. 5A, the movement proceeds in such a way that one-step slight vibration and subsequent three-step transition during one cycle $T_f$ are repeated. Pulses for driving the motor stepwise are timed for the second mode as indicated at broken line in FIG. 5B and for the first mode as indicated at solid line in FIG. 5C. The driving pulses timed as above are precedently programmed in the motor control circuit 12 and generated by reading the program in accordance with the signal from the decider 14 or 15. Preparation of a program for desired driving pulses will be obvious to those skilled in the art. By desirably setting the amount of movement in this manner, time for focusing can be set desirably. The amount of slight vibration during one cycle is so determined as to change focusing to a visually undetected slight extent and may also be set desirably by increasing the number of driving pulses during one cycle $T_f$ as exemplified by a four-step change characteristic indicated at A in FIG. 5A.

In the foregoing embodiments, the master lens means or the sensing device is moved for focusing but alternatively the compensator lens means may be moved for focusing in a manner not described herein.

With the embodiments described previously, a manual mechanism conventionally required for moving the front focusing or objective lens can also be eliminated and size and weight of the lens system can be reduced. Further, conventionally, the function of macro-focusing needed for imaging a near object which lies about 1 cm in front of the lens is typically implemented by moving the compensator lens means but in accordance with the foregoing embodiments, focusing adjustment covering the macro-range can easily be done by moving the master lens means or the image sensing device and the macro-focusing mechanism can be simplified to promote compactness and inexpensiveness of the automatic focusing apparatus. With the foregoing embodiments, the function of automatic macro-focusing, conventionally unattainable, can also be realized.

Figure 7A:
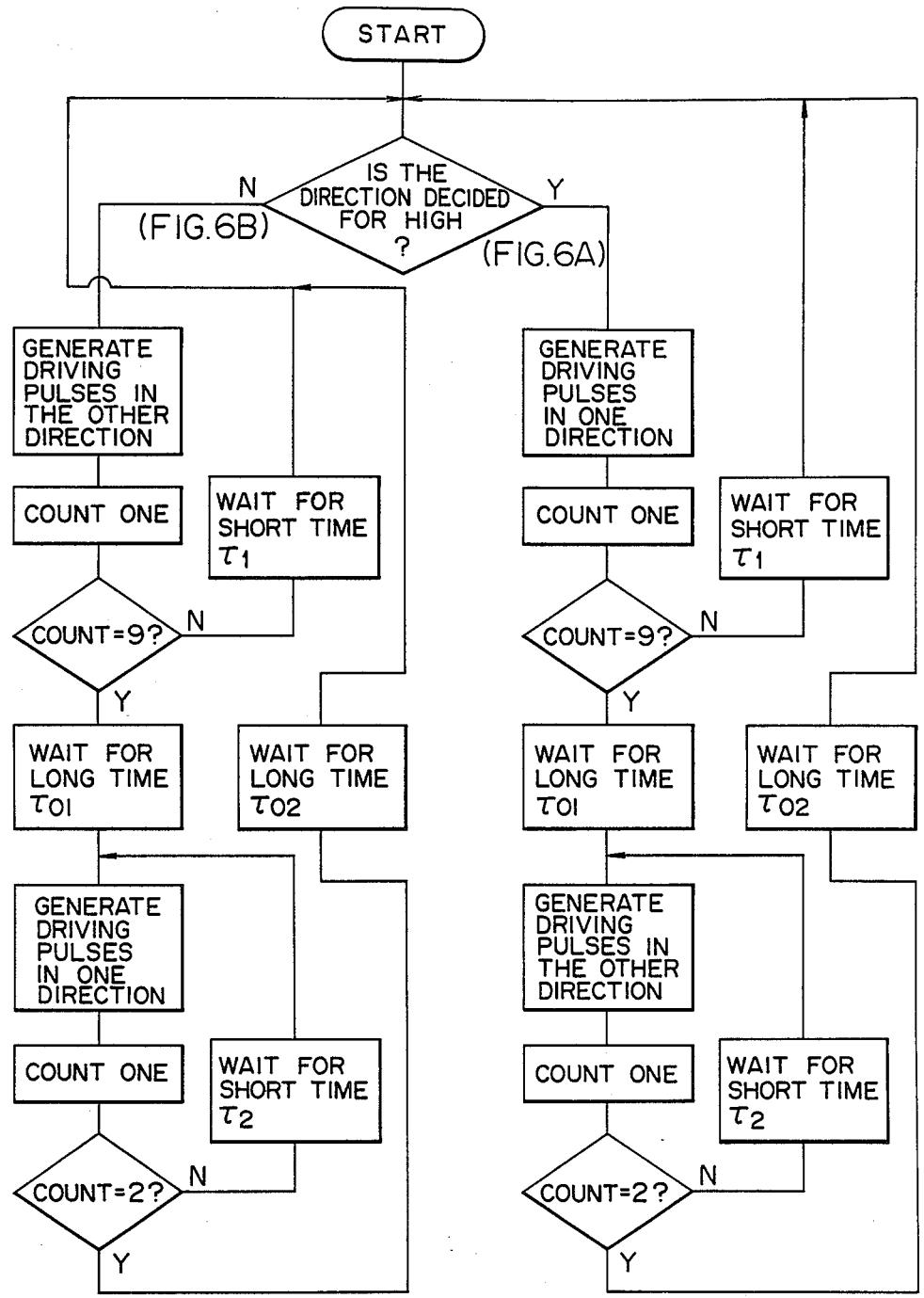

In the foregoing description, the focusing direction is determined on the basis of a slight vibration frequency component of a high frequency band component extracted from an image signal which is obtained when at least one optical element in the optical system is slightly vibrated to a visually undetected degree. Thus, in order to improve accuracy of the determination, sensitivity of detection of the slight vibration frequency component contained in the high frequency band component must be increased. If the amplitude of slight vibration of the optical element is increased with the view of increasing the slight vibration frequency component, an influence of the vibration upon images will be detected visually, thus impairing the quality of images. Then, for the purpose of improving the detection sensitivity to the slight vibration frequency component without impairing the image quality, in accordance with preferred examples of slight vibration as illustrated in FIGS. 6A and 6B, the amplitude of slight vibration of the optical element is not increased but in contrast, a slight vibration is generated stepwise by nine increasing (or decreasing) steps and two decreasing (or increasing) steps and duration widths $\tau_{01}$ and $\tau_{02}$ of upper (or lower) and lower (or upper) peak portions of the slight vibration are made larger than duration widths $\tau_2$ and $\tau_3$ of the increasing (or decreasing) and decreasing (or increasing) steps. Driving pulses for changing the slight vibration stepwise as described above are programmed in the motor control circuit 12 and the program may easily be prepared by those skilled in the art as necessary. Obviously, the examples of FIGS. 6A and 6B may be implemented in accordance with flow charts as exemplified in FIGS. 7A and 7B. Further, FIG. 7B shows a program for stopping the motor when the in-focus decision was made while the program shown in FIG. 7A is executed.

The above enlargement of the duration widths of slight vibration peak portions of the optical element is comparable to increase in the amplitude of the slight vibration frequency component detected from the detector 11 and is therefore effective to increase sensitivity of the direction decider.

We claim:

1. An automatic focusing apparatus for use in a video camera and the like comprising:
   an optical system including optical elements comprised of an objective lens means, a variator lens means, a compensator lens means, an image forming lens means and an image sensing device;
   means for moving and for slightly vibrating on optical element of said variator lens means, compensator lens means, image forming lens means and image sensing device for enabling focusing;
   means for extracting a high frequency band component containing a slight vibration component indicative of the slight vibration from an image signal produced from said image sensing device; and
   a feedback control system for controlling said moving means to control the position of said one optical element of the basis of said slight vibration component in said high frequency band component, so that the maximum of the high frequency band component from said extracting means is obtained.

2. An automatic focusing apparatus according to claim 1 wherein said moving means comprises a motor which can be driven by pulses to drive said one optical element.

3. An automatic focusing apparatus according to claim 2 wherein said motor is a stepping motor.

4. An automatic focusing apparatus according to claim 2 wherein said motor is an ultrasonic motor.

5. An automatic focusing apparatus according to claim 2 wherein said feedback control system comprises a motor control circuit adapted to generate pulses for driving said motor.

6. An automatic focusing apparatus according to claim 5 wherein said motor control circuit comprises means for making larger duration widths of maximum and minimum peak portions of a slight vibration of said one optical element than duration widths of steps by which the slight vibration changes.

7. An automatic focusing apparatus according to claim 1 wherein said one optical element driven by said moving means comprises at least one lens of said image forming lens means.

8. An automatic focusing apparatus according to claim 1 wherein said one optical element driven by said moving means comprises said sensing device.

9. An automatic focusing apparatus according to claim 1 wherein said one optical element driven by said moving means comprises at least one lens of said compensator lens means.

10. An automatic focusing apparatus according to claim 1, wherein said moving means includes a motor for controlling the position of said one optical element by moving said one optical element while said one optical element is slightly vibrated.

11. An automatic focusing apparatus for use in a video camera and the like comprising:
   an optical system including optical elements comprised of an objective lens means, a variator lens means, a compensator lens means, an image forming lens means and an image sensing device;
   means for moving and for slightly vibrating one optical element of said optical system other than said objective lens means for enabling focusing, said moving means including a motor capable of being driven by pulses;
   means for extracting a high frequency band component containing a slight vibration component indicative of the slight vibration from an image signal produced from said image sensing device; and
   a feedback control system for controlling said moving means to control the position of said one optical element on the basis of said slight vibration component in said high frequency band component by supplying the driving pulses to said motor, so that the maximum of the high frequency band component from said extracting means is obtained.

* * * * *